US010414870B2

(12) United States Patent
Nowak et al.

(10) Patent No.: US 10,414,870 B2
(45) Date of Patent: Sep. 17, 2019

(54) TRANSPARENT POLYMERS AND METHODS FOR MAKING THE SAME

(71) Applicant: The Boeing Company, Chicago, IL (US)

(72) Inventors: Andrew P. Nowak, Los Angeles, CA (US); April R. Rodriguez, Marina Del Ray, CA (US); Erin E. Stache, Glendale, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/807,243

(22) Filed: Jul. 23, 2015

(65) Prior Publication Data
US 2017/0022324 A1 Jan. 26, 2017

(51) Int. Cl.
C08G 75/26 (2006.01)
C08G 18/38 (2006.01)
C08G 75/00 (2006.01)
C08G 75/045 (2016.01)
C08G 18/72 (2006.01)
C08G 18/73 (2006.01)
C08G 18/75 (2006.01)
C08G 18/18 (2006.01)
G02B 1/04 (2006.01)

(52) U.S. Cl.
CPC .............. C08G 75/26 (2013.01); C08G 18/18 (2013.01); C08G 18/3876 (2013.01); C08G 18/722 (2013.01); C08G 18/73 (2013.01); C08G 18/758 (2013.01); C08G 75/00 (2013.01); C08G 75/045 (2013.01); G02B 1/04 (2013.01); G02B 1/043 (2013.01)

(58) Field of Classification Search
CPC ............................ C07C 321/02; C08F 136/07
See application file for complete search history.

(56) References Cited

U.S. PATENT DOCUMENTS

| 2,964,502 | A | * | 12/1960 | Wheelock | C08K 3/28 |
| | | | | | 526/205 |
| 3,030,344 | A | * | 4/1962 | Argabright | C08C 19/20 |
| | | | | | 522/1 |
| 3,505,166 | A | | 4/1970 | Jones et al. | |
| 3,624,160 | A | | 11/1971 | Jones et al. | |
| 3,759,871 | A | | 9/1973 | Hickner | |
| 4,082,712 | A | * | 4/1978 | Dannels | C08G 75/04 |
| | | | | | 204/157.76 |
| 4,390,595 | A | | 6/1983 | Yamagishi | |
| 6,008,296 | A | * | 12/1999 | Yang | C08G 75/045 |
| | | | | | 252/182.17 |
| 6,225,021 | B1 | | 5/2001 | Widawski et al. | |
| 6,399,190 | B1 | | 6/2002 | Myers et al. | |
| 8,334,340 | B2 | | 12/2012 | O'Brien et al. | |
| 2006/0057423 | A1 | * | 3/2006 | Steudel | C08G 65/329 |
| | | | | | 428/690 |
| 2009/0270528 | A1 | | 10/2009 | Bowman et al. | |
| 2010/0112259 | A1 | | 5/2010 | Cruse et al. | |
| 2011/0054136 | A1 | * | 3/2011 | Stiegman | C08G 73/0638 |
| | | | | | 528/9 |
| 2014/0329939 | A1 | * | 11/2014 | Iliopoulos | C08C 19/20 |
| | | | | | 524/68 |

FOREIGN PATENT DOCUMENTS

| EP | 0530757 A1 | 3/1993 |
| EP | 0665219 A1 | 8/1995 |
| EP | 1988110 A1 | 11/2008 |
| EP | 2725045 A1 | 4/2014 |

(Continued)

OTHER PUBLICATIONS

Encyclopedia (Encyclopedia of Polymer Science and Engineering, Wiley-Interscience, vol. 15, 1989, pp. 670-674).*
Bhagat (Macromolecules 45 (2012) 1174-1181).*
Charles E. Hoyle et al., "Thiol-Enes: Chemistry of the Past with Promise for the Future", Highlight, Journal of Polymer Science: Part A: Polymer Chemistry, vol. 42, 2004, pp. 5301-5338.
Sharad D. Bhagat et al., "High Refractive Index Polymers Based on Thio-Ene Cross-Linking Using Polarizable Inorganic/Organic Monomers", Macromolecules, 45, 2012, 10 pages (including 2 page supplement).
S. Krimm, "Infrared Spectra of High Polymers", Fortschr. Hochpolym.-Forsch., Bd. 2, S., 1960, pp. 51-172.

(Continued)

Primary Examiner — Kuo Liang Peng
(74) Attorney, Agent, or Firm — MH2 Technology Law Group LLP

(57) ABSTRACT

A novel copolymer is made from a thiol terminated hydrocarbon monomer and at least one additional monomer chosen from the compounds of i) a terminally unsaturated hydrocarbon monomer, ii) an isocyanate functionalized hydrocarbon monomer and iii) a silane monomer substituted with two or more $C_2$ to $C_8$ terminally unsaturated alkenyl groups or $C_2$ to $C_8$ terminally unsaturated alkynyl groups, wherein the copolymer is a linear polymer, branched polymer or crosslinked polymer network, with the following provisos: if the at least one additional monomer is either a) a terminally unsaturated hydrocarbon monomer that is not a polymer having 12 carbon atoms or more, or b) a silane monomer, then the thiol terminated hydrocarbon monomer includes a saturated hydrocarbon ring with two or more terminal thiol groups attached to the hydrocarbon ring; if the terminally unsaturated hydrocarbon monomer is polybutadiene, the polybutadiene contains from about 0 mol % to about 30 mol % of polymer units in the cis-1,4-butadiene form; and if the at least one additional monomer is an isocyanate functionalized hydrocarbon monomer, then a ratio of the molecular mass of the thiol terminated hydrocarbon monomer to the number of sulfur atoms in the thiol terminated hydrocarbon monomer ranges from 65 to 500.

19 Claims, No Drawings

(56) References Cited

FOREIGN PATENT DOCUMENTS

| | | | |
|---|---|---|---|
| JP | 2002348349 A | | 12/2002 |
| JP | 2012153794 A | | 8/2012 |
| KR | 20070020453 A | | 2/2007 |
| WO | 2010059363 A1 | | 5/2010 |
| WO | 2010059402 A1 | | 5/2010 |
| WO | 2013 092809 | * | 6/2013 |
| WO | WO2013/167576 A2 | | 11/2013 |

OTHER PUBLICATIONS

European Search Report for EP Appl. No. 16179807.9 dated Dec. 9, 2016.
Communication pursuant to Article 94(3) EPC dated Mar. 16, 2018 in corresponding European Application No. 16179807.9, 4 pgs.
Requisition including Examination Search Report dated Apr. 23, 2019 in corresponding Canadian Application 2,929,031 (16 pages).

* cited by examiner

TRANSPARENT POLYMERS AND METHODS FOR MAKING THE SAME

DETAILED DESCRIPTION

Field of the Disclosure

The present disclosure is directed to novel transparent copolymers and methods for making such polymers.

BACKGROUND

Modern infrared cameras operate over multiple bands in both the midwave and longwave radiation spectrums. In order to function successfully, the camera's detector surface must be enclosed in an IR transmissive window or domed enclosure. When used in service on an automotive or aerospace vehicle the enclosure must not only be IR transmissive but able to withstand considerable environmental exposure in the form of temperature extremes along with high speed wind, rain, ice, dust and dirt erosion. Such conditions will rapidly degrade soft, non-durable transmission windows through erosion and surface etching.

Beyond the direct needs of pure infrared systems, current advanced imaging systems look to combine detection capabilities in both the visible and IR wavelength ranges. This presents a requirement for moldable, durable window materials that are not only transparent in the IR, but also in the visible spectrum. There are relatively few pure materials with such broadband transmission and those that do exist are often ionic crystals or semiconductors typically resulting in brittle bulk material properties and significant aqueous solubility. These properties limit the material's potential for applications in which moldable, durable materials having the ability to withstand long term environmental exposure are desired.

For example, current state of the art IR transmissive windows such as germanium, $BaF_2$, ZnS, ZnSe, $CaF_2$, NaCl, KCl, Si, Saphire, MgO, $MgF_2$, PbF, LiF, GaAs, fused silica, CdTe, $AsS_3$, KBr, CsI, diamond, Thallium Bromoiodide (ThBrI), Thallium Bromochloride (ThBrCl), and Germanium Arsenic Selenide suffer from one or more of the following issues: opacity in the visual wavelengths, brittle crystalline behavior, difficulty of making windows that are of suitable size and also visually transparent, and/or being composed of hygroscopic salts. These properties often preclude their use in many environmentally challenging applications where exposure to heat, impact, and moisture is expected.

The vast majority of polymeric materials are highly IR absorptive in the wavelength ranges commonly employed in IR detectors and cameras. This is due to the interaction of common bond structures with IR wavelengths including esters, ketones, ethers, carbon-halogen bonds, and aromatic species. Thus, for fabricating IR transmissive materials, most commercially available polymer compounds will not work, with the exception of unsaturated hydrocarbon species, such as, for example, poly(ethylene). However, these hydrocarbon species typically suffer from lack of transparency due to crystallinity and low glass transition temperature properties. Thus, the use of polymeric materials for visual and IR transparent panels is limited by the tendency of the majority of commercially available polymeric materials (e.g., polycarbonate, polystyrene, Teflon, polyethylene, and polypropylene) to display one or more of the following shortcomings: broadband IR absorbance, visual opacity, and relatively low softening temperatures.

One IR transparent polymeric material is POLYIR® made by Fresnel Technologies. POLYIR is a collection of flexible plastic materials that display good transparency in multiple IR bands. However, POLYIR materials show significant visual haze or opacity, low maximum service temperatures and limited tolerance to sunlight and other environmental factors.

Thus, there is a need in the art for durable, rigid, visually transparent polymers that also demonstrate reduced absorption in both mid- and long-wave IR bands, and processes for making such compounds.

SUMMARY

The present disclosure is directed to a novel copolymer. The copolymer is made from a thiol terminated hydrocarbon monomer and at least one additional monomer chosen from the compounds of i) a terminally unsaturated hydrocarbon monomer, ii) an isocyanate functionalized hydrocarbon monomer and iii) a silane monomer substituted with two or more $C_2$ to $C_8$ terminally unsaturated alkenyl groups or $C_2$ to $C_8$ terminally unsaturated alkynyl groups, wherein the copolymer is a linear polymer, branched polymer or cross-linked polymer network, with the following provisos: if the at least one additional monomer is either a) a terminally unsaturated hydrocarbon monomer that is not a polymer having 12 carbon atoms or more, or b) a silane monomer, then the thiol terminated hydrocarbon monomer includes a saturated hydrocarbon ring with two or more terminal thiol groups attached to the hydrocarbon ring; if the terminally unsaturated hydrocarbon monomer is polybutadiene, the polybutadiene contains from about 0 mol % to about 30 mol % of polymer units in the cis-1,4-butadiene form; and if the at least one additional monomer is an isocyanate functionalized hydrocarbon monomer, then the molecular mass per sulfur atom of the thiol terminated hydrocarbon monomer ranges from 65 to 500.

The present application is also directed to a method of forming a copolymer. The method comprises combining a thiol terminated hydrocarbon monomer and at least one additional monomer to form a mixture. The at least one additional monomer is chosen from the compounds of (i) a terminally unsaturated hydrocarbon monomer, (ii) an isocyanate functionalized hydrocarbon monomer; and (iii) a silane monomer substituted with two or more $C_2$ to $C_8$ terminally unsaturated alkenyl groups or $C_2$ to $C_8$ terminally unsaturated alkynyl groups. The thiol terminated hydrocarbon monomer and the at least one additional monomer are reacted to form the copolymer, with the following provisos: if the at least one additional monomer is either a) a terminally unsaturated hydrocarbon monomer that is not a polymer having 12 carbon atoms or more, or b) a silane monomer, then the thiol terminated hydrocarbon monomer includes a saturated hydrocarbon ring with two or more terminal thiol groups attached to the hydrocarbon ring; if the terminally unsaturated hydrocarbon monomer is polybutadiene, the polybutadiene contains from about 10 mol % to about 30 mol % of polymer units in the cis-1,4-butadiene form; and if the at least one additional monomer is an isocyanate functionalized hydrocarbon monomer, then the molecular mass per sulfur atom of the thiol terminated hydrocarbon monomer ranges from 65 to 500.

It is to be understood that both the foregoing general description and the following detailed description are exemplary and explanatory only and are not restrictive of the present teachings, as claimed.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to novel classes of sulfur containing polymeric materials that are transparent in at least one of the visual spectrum (e.g., 390 nm to 700 nm) or IR wavelength ranges of about 4 microns to 12 microns. In various examples, the copolymers are transparent in the visual but not the IR. In other examples, the copolymers are transparent in both the visual and IR ranges. These sulfur containing polymers include 1) thiolenes produced by the reaction of thiols and terminal vinyl functional groups; and 2) thiocarbamates produced through a reaction of thiol groups and isocyanates. The C—S linkages for these compounds formed upon polymerization do not display significant absorption bands in ranges of interest to common IR cameras. The polymeric materials can be linear polymers, branched polymers or a crosslinked polymer network. The copolymers of the present disclosure can be used to make composite materials that are transparent to radiation in both the visible and infrared spectrums. This can solve the problem of a lack of such materials that are capable of being formed into complex curved shapes and/or displaying the mechanical durability to meet environmental challenges experienced on many vehicles, or in other applications such as helmet cams or CCTVs. The compositions and copolymers of the present disclosure can be used in any desired application, such as known applications or applications developed in the future for visually transparent or translucent materials and/or IR transparent materials.

The thiocarbamates provide good rigidity and relatively high glass transition temperatures compared to the thiolenes describe above, but at the expense of a higher IR absorption in the long wave region. These thiocarbamate polymers may be suitable for application as ophthalmic lenses, among other things.

Thus, the present application is directed to a copolymer made from a thiol terminated hydrocarbon monomer and at least one additional monomer chosen from the compounds of i) a terminally unsaturated hydrocarbon monomer, ii) an isocyanate functionalized hydrocarbon monomer and iii) a silane monomer substituted with two or more $C_2$ to $C_8$ terminally unsaturated alkenyl groups or $C_2$ to $C_8$ terminally unsaturated alkynyl groups. The following provisos apply: if the at least one additional monomer is either a) a terminally unsaturated hydrocarbon monomer that is not a polymer having 12 carbon atoms or more, or b) a silane monomer, then the thiol terminated hydrocarbon monomer includes a saturated hydrocarbon ring with two or more terminal thiol groups attached to the hydrocarbon ring; if the terminally unsaturated hydrocarbon monomer is polybutadiene, the polybutadiene contains from about 0 mol % to about 30 mol % of polymer units in the cis-1,4-butadiene form; and if the at least one additional monomer is an isocyanate functionalized hydrocarbon monomer, then a ratio of the molecular mass of the thiol terminated hydrocarbon monomer to the number of sulfur atoms in the thiol terminated hydrocarbon monomer ranges from 65 to 500.

The copolymers of the present disclosure are rigid, visually transparent polymers that demonstrate reduced absorption in both mid and long wave IR bands compared to many other engineering plastics. Additionally, the copolymers are thermoplastic polymers, which allow for shaping or molding through thermoforming of the material over complex, conformal surfaces. Many conventional transparent materials are difficult or impossible to shape in such a way.

The thiol terminated hydrocarbon monomers employed to make the copolymer of the present disclosure can be substituted or unsubstituted, linear, branched or cyclic $C_3$ to $C_{36}$ saturated hydrocarbons having two or more terminal thiol groups. Examples of suitable thiol terminated hydrocarbon monomers include at least one compound chosen from the compounds of formulae 1 and 2:

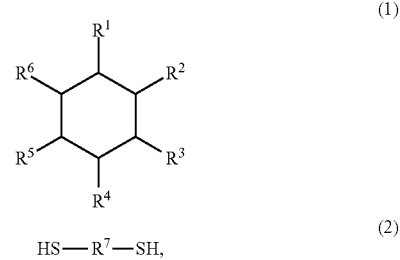

With respect to formula 1: $R^1$, $R^2$, $R^3$, $R^4$, $R^5$, and $R^6$ are independently chosen from hydrogen, —SH and —R'SH, where R' is a $C_1$ to $C_{10}$ hydrocarbon bridge, with the proviso that at least two of $R^1$, $R^2$, $R^3$, $R^4$, $R^5$, and $R^6$ are not hydrogen. In an example, three or four of $R^1$, $R^2$, $R^3$, $R^4$, $R^5$, and $R^6$ are not hydrogen. In another example, R' is a $C_2$ to $C_4$ hydrocarbon bridge, such as an ethyl bridge. Specific examples of the compounds of formula 1 include 2-[2,4-bis (2-mercaptoethyl) cyclohexyl]ethanethiol and 2-[3,5-bis(2-mercaptoethyl)cyclohexyl]ethanethiol. With respect to formula 2, $R^7$ is a $C_2$ to $C_{10}$ hydrocarbon bridge, such as a $C_4$ to $C_8$ hydrocarbon bridge.

As set forth in the provisos above, where the at least one additional monomer is an isocyanate functionalized hydrocarbon monomer, the molecular mass per sulfur atom of the thiol terminated hydrocarbon monomer ranges from 65 to 500 daltons. The molecular mass per sulfur atom of the thiol monomer is not so limited where monomers other than isocyanates are employed. However, in an alternative example, even where no isocyanate monomer is employed to make the copolymers, the ratio of the molecular mass of the thiol terminated hydrocarbon monomer to the number of sulfur atoms in the thiol terminated hydrocarbon monomer can range from 65 to 500, such as about 70 to about 400 or about 75 to about 300 or about 80 to about 250, regardless of what additional monomers are employed.

Examples of suitable terminally unsaturated hydrocarbon monomers for making the copolymers of the present disclosure include substituted or unsubstituted, linear, branched or cyclic $C_3$ to $C_{36}$ hydrocarbons that are internally saturated and have two or more terminal vinyl or alkynyl groups. For example, the hydrocarbon monomer can be a compound of formulae of 3, 4, 5, or 6:

(3)

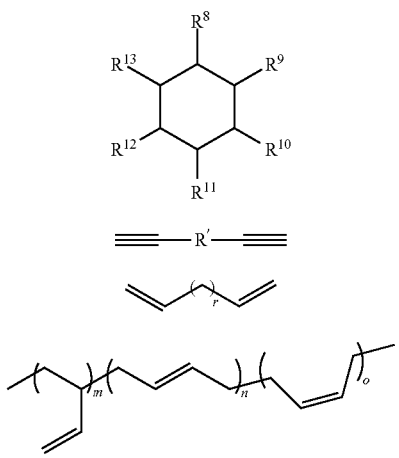

(4)

≡—R'—≡

(5)

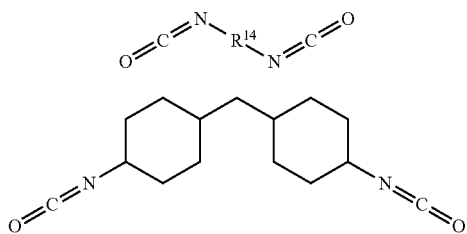

(6)

where:
R$^8$, R$^9$, R$^{10}$, R$^{11}$, R$^{12}$, and R$^{13}$ are independently chosen from hydrogen and alkenyl substituents having a terminal vinyl group, where at least two of R$^8$, R$^9$, R$^{10}$, R$^{11}$, R$^{12}$, and R$^{13}$ are not hydrogen;
R' is a $C_2$ to $C_{10}$ hydrocarbon bridge;
r is an integer ranging from 1 to 10;
m ranges from about 70 mol % to about 90 mol %;
n is 0 mol % to about 30 mol %;
o is 0 mol % to about 30 mol %; and
n+o is about 10 mol % to about 30 mol %.

Formula 6 above shows a polybutadiene polymer as one example of a terminally unsaturated hydrocarbon monomer. In an example, the weight average molecular weight of the polybutadiene polymers of formula 6 can range from about 1400 to about 5200 g/mol. As can be seen from the values of m, n and o, the polybutadiene contains from about 0 mol % to about 30 mol % of polymer units in the trans-1,4-butadiene form (as indicated by 'n') and from about 0 mol % to about 30 mol % of polymer units in the cis-1,4-butadiene form (as indicated by V). The polybutadiene contains a majority of units that result in a terminal vinyl branch group on the polymer (about 70 mol % to about 90 mol %).

In an example, the interior of the precursor materials, such as the interior of any of the hydrocarbon monomers of formulae 3, 4, or 5 discussed above and/or the hydrocarbon moieties of the thiols and thiocyanates, contain only saturated hydrocarbon species. This can help ensure that the entire polymeric backbone produces the desired IR transparency. The term "interior" here refers to all but terminal atom positions and the bonds attaching the terminal atoms to the monomer.

Suitable isocyanate functionalized hydrocarbon monomers for making the copolymers of the present disclosure include substituted or unsubstituted, linear, branched or cyclic $C_3$ to $C_{36}$ saturated hydrocarbon monomers having two or more terminal isocyanate groups. For example, the isocyanate functionalized hydrocarbon monomer can be a compound of formulae 7 or 8:

(7)

O=C=N—R$^{14}$—N=C=O (8)

where R$^{14}$ is a $C_3$ to $C_{12}$ n-alkyl bridge. In another example, R$^{14}$ is a $C_4$ to $C_8$ n-alkyl bridge, such as an n-hexyl bridge.

Examples of suitable silane monomers substituted with two or more $C_2$ to $C_8$ terminally unsaturated alkenyl groups or $C_2$ to $C_8$ terminally unsaturated alkynyl groups include any monomers of formula 9:

(9)

$$\begin{array}{c} R^{20} \quad R^{21} \\ \diagdown \; \diagup \\ Si \\ \diagup \; \diagdown \\ R^{22} \quad R^{23} \end{array}$$

where R$^{20}$, R$^{21}$, R$^{22}$, and R$^{23}$ can be independently chosen from hydrogen, $C_2$ to $C_8$ terminally unsaturated alkenyl groups and $C_2$ to $C_8$ terminally unsaturated alkynyl groups, where two, three or all four of the R$^{20}$, R$^{21}$, R$^{22}$, and R$^{23}$ are not hydrogen. In an example the alkenyl groups and alkynyl groups are straight hydrocarbon chain groups each have only one double or triple bond that is positioned at the terminal carbon with no internal unsaturation. In an example, the substituted silane monomer can be, for example, tetravinylsilane, or tetraallylsilane.

When making the copolymers of the present disclosure, as discussed in the provisos above, if the at least one additional monomer is either 1) a terminally unsaturated hydrocarbon monomer that is not a polymer having 12 carbon atoms or more, such as would be the case for formulae 3 to 5, or 2) a silane monomer, as would be the case for the compounds of formula 9, then the thiol terminated hydrocarbon monomer includes a saturated hydrocarbon ring with two or more terminal thiol groups attached to the hydrocarbon ring, such as the compounds of formula 1 above. Alternatively, if the at least one additional monomer is a terminally unsaturated hydrocarbon monomer that is a polymer having 12 carbon atoms or more, such as would be the case for the compounds of formula 6, or is an isocyanate functionalized hydrocarbon monomer, then any of the thiol terminated hydrocarbon monomers disclosed herein, such as those of formulae 1 and 2, can be used.

The present disclosure is also directed to a method of making the sulfur containing copolymers of the present disclosure. The method comprises combining a thiol terminated hydrocarbon monomer and at least one additional monomer to form a mixture. The at least one additional monomer is chosen from the compounds of (i) a terminally unsaturated hydrocarbon monomer, (ii) a isocyanate functionalized hydrocarbon monomer; and (iii) a silane monomer substituted with two or more $C_2$ to $C_8$ terminally unsaturated alkenyl groups or $C_2$ to $C_8$ terminally unsaturated alkynyl groups. One or more solvents and/or catalysts can also be employed in the reaction process. The same provisos apply to the method as were discussed above with respect to the compounds of the present disclosure.

The methods of the present disclosure include reacting a thiol terminated hydrocarbon monomer and at least one of the additional monomers to form the sulfur containing copolymers. Any of the thiol terminated hydrocarbon monomers, terminally unsaturated hydrocarbon monomers, isocyanate functionalized hydrocarbon monomer and substituted silane monomers disclosed herein can be employed as reactants to form the sulfur containing copolymers.

Where the at least one additional monomer is the hydrocarbon monomer or a substituted silane monomer, polymerization can be carried out with either free radical UV initiators or through high intensity UV light alone. Thus, the reaction process can include exposing the monomer mixture to ultraviolet light. Examples of the general reactions can be illustrated as follows:

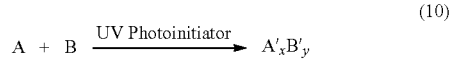

(10)

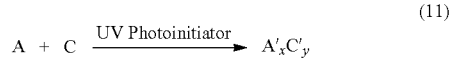

(11)

where "A" is any of the thiol terminated hydrocarbon monomers disclosed herein; "B" is any of the terminally unsaturated hydrocarbon monomer disclosed herein; "C" is any of the silane monomers substituted with two or more $C_2$ to $C_8$ terminally unsaturated alkenyl groups or $C_2$ to $C_8$ terminally unsaturated alkynyl groups, as described herein; A', B' and C' are the corresponding polymer units respectively formed from monomers A, B and C during the polymeric reaction; and the values for x and y each range from about 0.3 to about 0.7, where x+y=1.

Where the at least one additional monomer is an isocyanate functionalized hydrocarbon monomer, the reaction process can include adding a catalyst to the mixture. Examples of suitable catalysts include base catalysts such as amines (e.g., tertiary amines), or metal salt species (e.g., Dibutyltin dilaurate and homologous thereof, as well as other Sn salt compounds). Examples of the general reactions can be illustrated as follows:

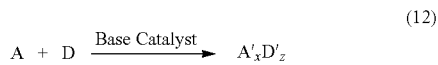

(12)

Where "A" is any of the thiol terminated hydrocarbon monomers disclosed herein; "D" is any of the isocyanate functionalized hydrocarbon monomers disclosed herein; A' and D' are the corresponding polymer units respectively formed from monomers A and D during the polymeric reaction; and the values for x and z each range from about 0.3 to about 0.7, where x+z=1. The product $A'_xD'_z$ includes one or more thiocarbamate moieties.

In an example, the polymeric materials made according to the principles of the present disclosure comprise saturated hydrocarbon moieties, with optional silicon atoms incorporated into the hydrocarbon backbone if silane reactants are employed, and one or more heteroatom containing moieties chosen from thioether linkages and thiocarbamate linkages. In an example, it is desirable that the linkages in the copolymer are only thioether linkages and/or thiocarbmatate linkages, assuming conversion of monomer reactants to the polymer product was complete. In actuality, however, the polymer reaction may often not be entirely complete, side reactions may occur and/or the reactant monomers may contain residual impurities, so that other unintended bond structures may be included in the polymer. For example, it is expected that a certain amount of unreacted thiol and isocyanate functional groups from the monomer reactants may be included in the product. That said, it is desirable to keep bond structures that absorb radiation in the visual spectrum or in the IR wavelength ranges of about 4 to about 12 microns at sufficiently low concentrations so as to maintain a desired level of transparency, since increasing the density of absorptive bonds in the polymer will begin to progressively absorb more and more light and thereby reduce transparency. Examples of unwanted moieties that contain light absorbing bond structures include esters, carboxylic groups, carbonyl groups, ketones, ethers, carbon-halogen bonds and aromatic species. The amounts of these groups that can be included in the materials without undesirably effecting transparency may vary depending on the radiation absorbing properties of each of the groups. In an example, the copolymers of the present disclosure contain none, or substantially none, of any one of esters, carboxylic groups, carbonyl groups, ketones, ethers, carbon-halogen bonds, aromatic moieties or thiosulfonato groups. The precise amounts of any residual concentrations of these moieties in the copolymers of the present disclosure may be difficult to determine due to the nature of the product. Thus, the term "substantially none" is defined herein to mean that the monomer reactants are chosen to avoid formation of these unwanted moieties (e.g., that any such moieties that are formed do so as a result of chemical impurities in the reactants and/or unwanted side reactions and so forth).

The copolymers of the present disclosure can be relatively large molecules, such as macromolecules. These molecules are crosslinked to the point that they create a percolating network or a network that effectively is crosslinked to the point that the entire macroscopic piece is a single molecule. Thus, the molecular weight of a single copolymer and/or the number of copolymers contained in an amount of bulk polymeric material formed by the processes of the present disclosure can be difficult or impossible to determine. The term "bulk polymeric material" is defined to mean, for purposes of this disclosure, a polymeric product made by the processes of the present disclosure that has been dried to remove any solvents.

In an example, the monomer reactants used to make the copolymers of the present disclosure are limited to only those disclosed herein. In an example, the thiol terminated hydrocarbon monomer and the at least one additional monomer, such as a terminally unsaturated hydrocarbon monomer, an isocyanate functionalized hydrocarbon monomer; and a silane monomer substituted with two or more $C_2$ to $C_8$ terminally unsaturated alkenyl groups or $C_2$ to $C_8$ terminally unsaturated alkynyl groups, as disclosed herein, are the only monomers reacted to form the copolymers of the present disclosure, with the exception of any residual monomer impurities introduced with the reactants. One technique for achieving the desired transparency is to employ monomers with a high degree of purity so as to reduce unwanted light absorbing bond structures. In an example, each of the monomer reactants have a purity of 95 weight % or more, such as 97 weight % or 98 weight % or more.

The copolymers of the present disclosure are amorphous (e.g., having little or no crystallinity), which increases visual transparency. The low crystallinity is a result of the polymer units being arranged randomly in the copolymer structure. Also, as mentioned above, for purposes of IR transparency the sulfur containing copolymer product can be saturated. Alternatively, the sulfur containing copolymers can include some internal unsaturation, such as where the polybutyldiene polymers discussed above are used as the at least one additional monomer.

EXAMPLES

Example 1—Synthesis of Thiolene Film Composed of 1,2,4-trivinylcyclohexane and 1,6-hexanedithiol 1,2,4-Trivinylcyclohexane (0.2 g, 1.23 mmol) and 1,6-hexandithiol (0.28 g, 1.85 mmol) were combined and vortexed well. A photoinitiator such as 2,2-Dimethoxy-2-phenylacetophenone (DMPA) was added in a small amount (0.025 wt %) for faster curing of the film. The thiolene mixture was placed between two glass slides (75 mm×50 mm; thickness 1 mm) with a Teflon spacer (0.13 mm thick) and fastened with clips. The film was exposed to UV (H bulb (5×60 sec)) on three occasions. The film was carefully removed from the glass slides to give a clear film.

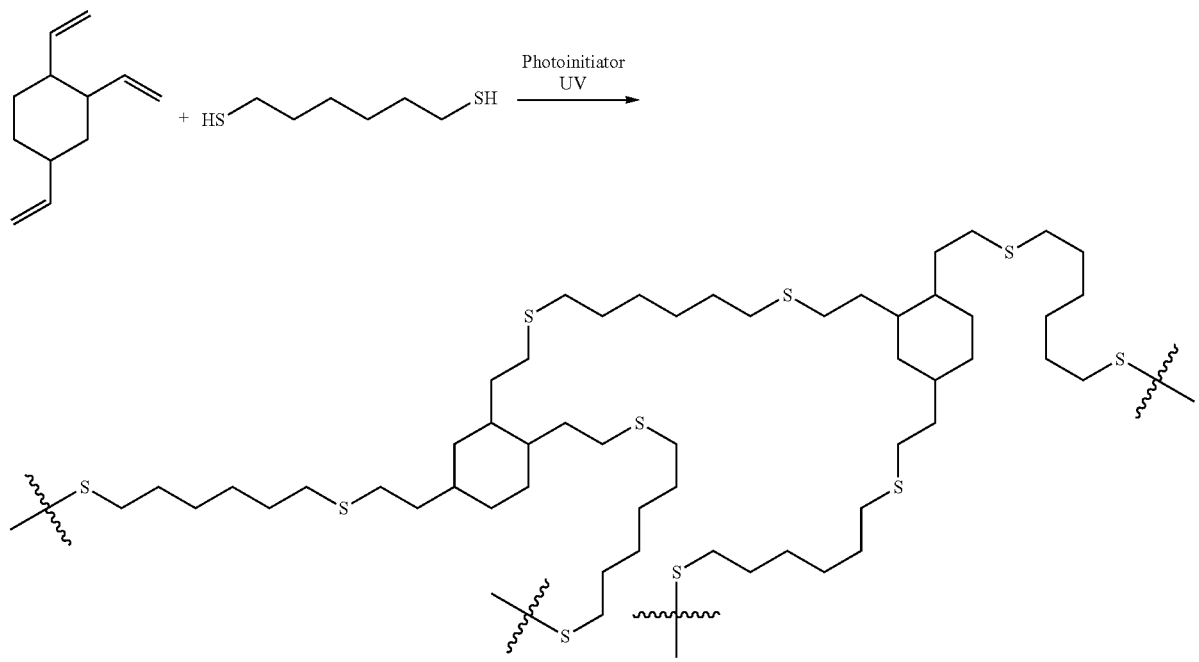

Example 2—Synthesis of Thiocarbamate Film Composed of 4,4'-methylenebis(4-cyclohexylisocyanate) (HMDI) and 2-[2,4-bis(2-mercaptoethyl)cyclohexyl]ethanthiol 2-[2,4-bis(2-mercaptoethyl)cyclohexyl]ethanthiol (0.150 g, 0.57 mmol; synthesized previously) and 4,4'-methylenebis(4-cyclohexylisocyanate) (0.225 g, 0.86 mmol, Sigma Aldrich) were combined and vortexed well. To the mixture, tetrahydrofuran (937 µL) was added and the mixture vortexed again. For the reaction to proceed, triethylamine dispersed in tetrahydrofuran was added to the vial (187 µL, 1% triethylamine in tetrahydrofuran). The film was prepared by drop casting the solution onto a glass substrate and covering the substrate with a glass dish slowly allowing the solvent to evaporate leaving a clear film.

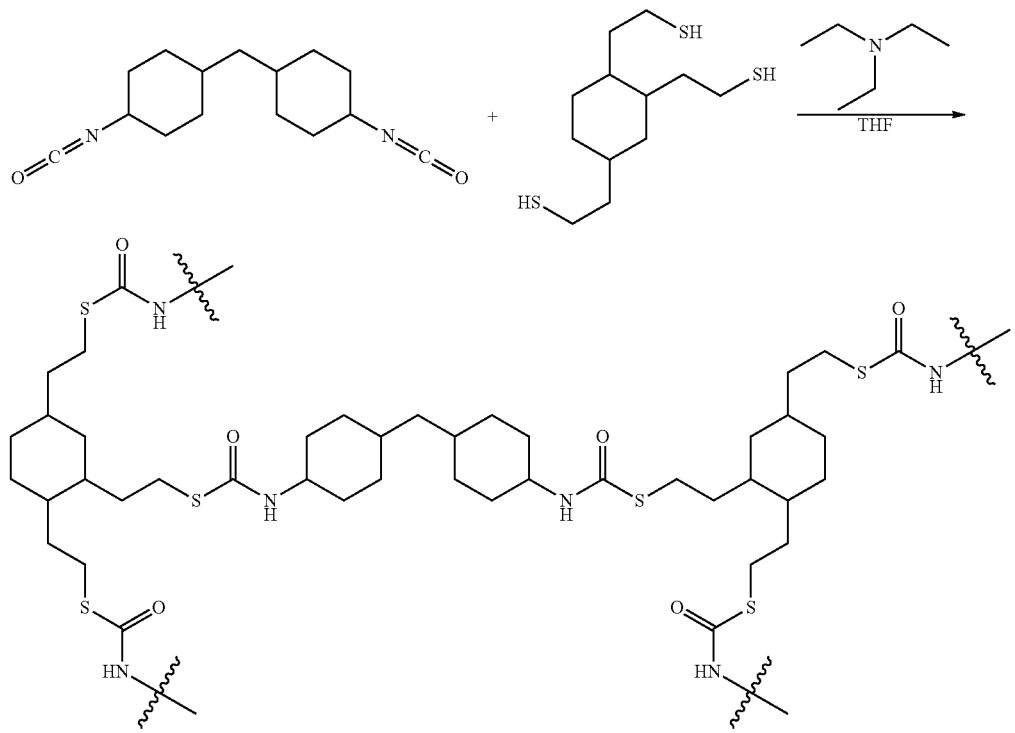

Example 3—Synthesis of Thiocarbamate Film Composed of 1,6-diisocyanatohexane (HDI) and 2-[2,4-bis(2-mercaptoethyl)cyclohexyl]ethanethiol 2-[2,4-bis(2-mercaptoethyl)cyclohexyl]ethanethiol (0.100 g, 0.38 mmol; synthesized previously) and 1,6-diisocyanatohexane (0.095 g, 0.57 mmol, Sigma Aldrich) were combined and vortexed well. To the mixture, tetrahydrofuran (565 μL) was added and the mixture was vortexed again. The catalyst, triethylamine, dispersed in tetrahydrofuran was added to the vial (20 μL, 1% triethylamine in THF). The film was prepared by drop casting the solution onto a glass substrate and allowing the solvent to evaporate leaving a clear film.

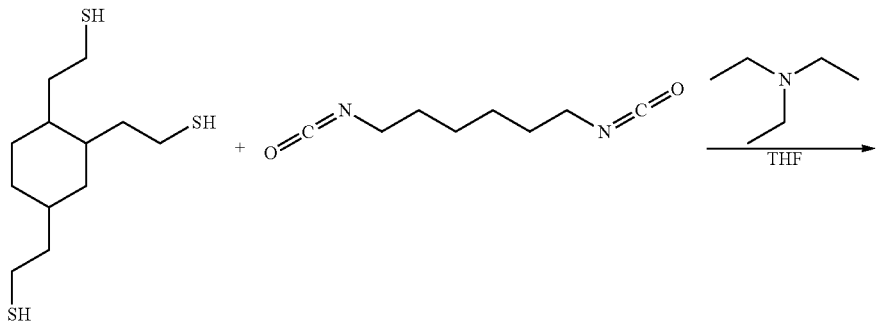

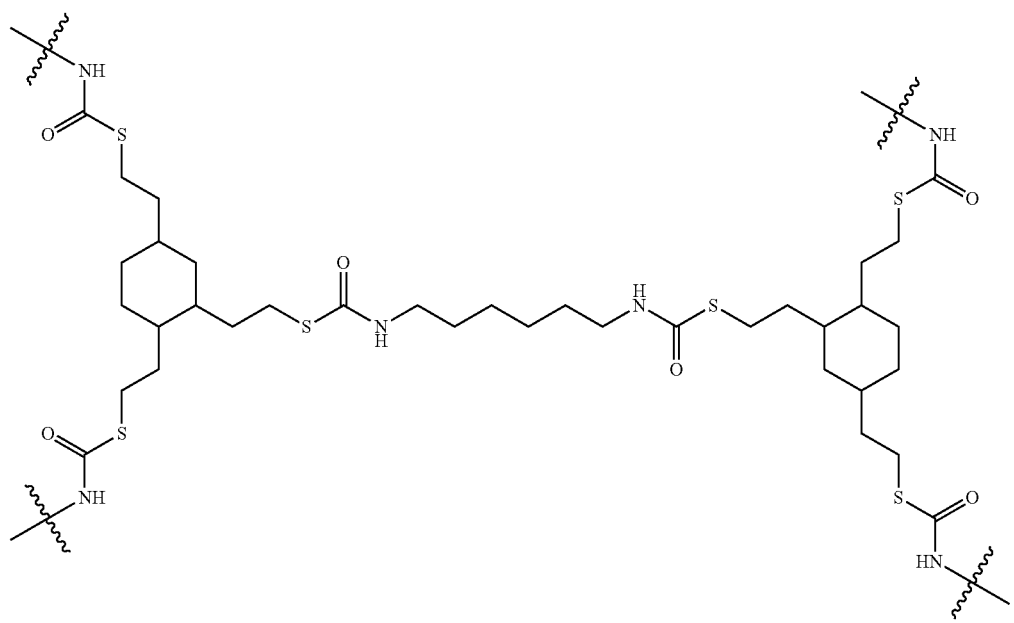

Example 4—Synthesis of Thiocarbamate Film Composed of 1,6-diisocyanatohexane (HDI), 4,4'-methylenebis(4-cyclohexylisocyanate) (HMDI) and 2-[2,4-bis(2-mercaptoethyl)cyclohexyl]ethanethiol 2-[2,4-bis(2-mercaptoethyl)cyclohexyl]ethanethiol (0.35 g, 1.33 mmol; synthesized previously), 1,6-diisocyanatohexane (0.150 g, 0.89 mmol, Sigma Aldrich) and 4,4'-methylenebis(4-cyclohexylisocyanate) (0.234 g, 0.89 mmol, Sigma Aldrich) were combined and vortexed well. To the mixture, 2-butanone (2.02 mL) was added and the mixture was vortexed again. Triethylamine dispersed in 2-butanone was added to the vial (180 μL, 1% triethylamine in 2-butanone) to catalyze the reaction. The film was prepared by drop casting the solution onto a glass substrate and allowing the solvent to evaporate leaving a clear film.

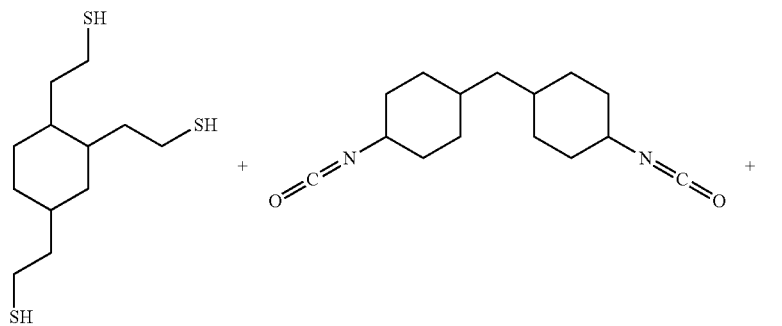

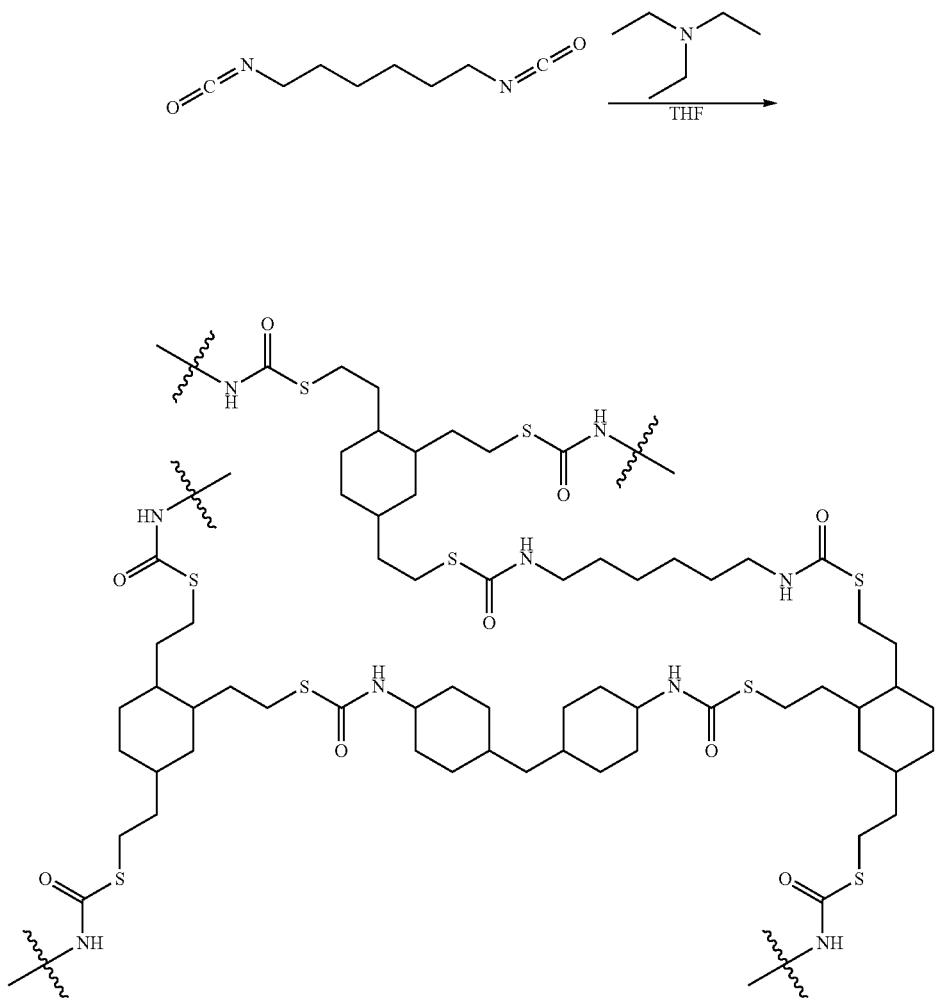

Example 5—Synthesis of Thiolene Film Composed of 2-[2,4-bis(2-mercaptoethyl)cyclohexyl]ethanethiol and tetravinylsilane In a scintillation vial, 2-[2,4-bis(2-mercaptoethyl) cyclohexyl]ethanethiol (0.5 g, 1.89 mmol; synthesized previously) and tetravinylsilane (0.19 g, 1.39 mmol, Sigma Aldrich) were combined and mixed using a vortex. A photoinitiator such as 2,2-Dimethoxy-2-phenylacetophenone (DMPA) can be added in a small amount (0.025 wt %) for faster curing of the film. The thiolene mixture is placed between two glass slides (75 mm×50 mm; thickness 1 mm) with a Teflon spacer (0.13 mm thick) and fastened with clips. The film was exposed to UV (H bulb (5×60 sec)) on three occasions. The film was carefully removed from the glass slides to give a clear film.

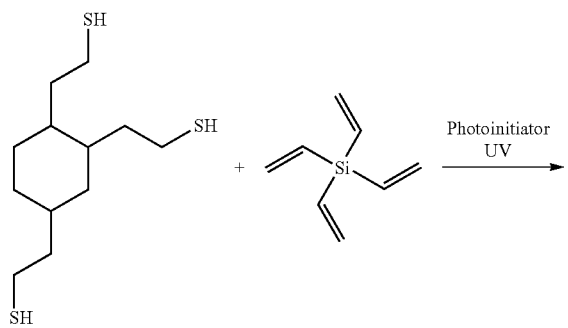

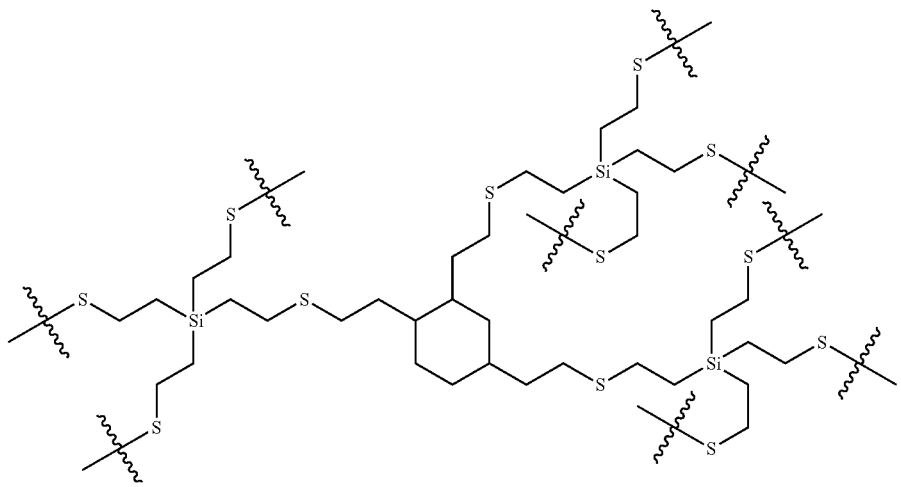

Example 6—Synthesis of Thiolene Film Composed of 1,6-hexanedithiol and 1,6-heptadiyne Hexanedithiol (0.979 g, 6.51 mmol) was combined with 1,6-heptadiyne (0.300 g, 3.26 mmol) and vortexed well. DMPA (0.32 mg) was added and the mixture vortexed again. The mixture was placed between two glass slides (75 mm×50 mm) with a telfon spacer (0.13 mm thick) and fastened by clips. The film was exposed to UV (H2 bulb (5×60 sec)) on three occasions. The film was carefully removed from the glass slides to give a clear film.

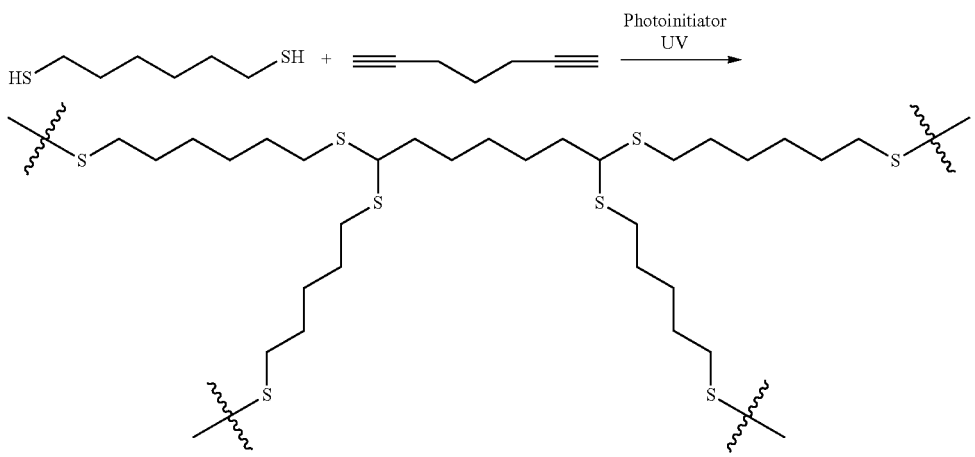

Example 7—Synthesis of Thiolene Film Composed of 2-[2,4-bis(2-mercaptoethyl)cyclohexyl]ethanethiol and 1,2,4-trivinylcyclohexane 2-[2,4-bis(2-mercaptoethyl)cyclohexyl]ethanethiol (0.614 g, 3.78 mmol) was combined with 1,2,4-trivinylcyclohexane (0.750 g, 3.78 mmol) and vortexed well. DMPA (0.34 mg) was added and the mixture vortexed again. The mixture was placed between two glass slides (75 mm×50 mm) with a telfon spacer (0.13 mm thick) and fastened by clips. The film was exposed to UV (H2 bulb (5×60 sec)) on three occasions. The film was carefully removed from the glass slides to give a clear film.

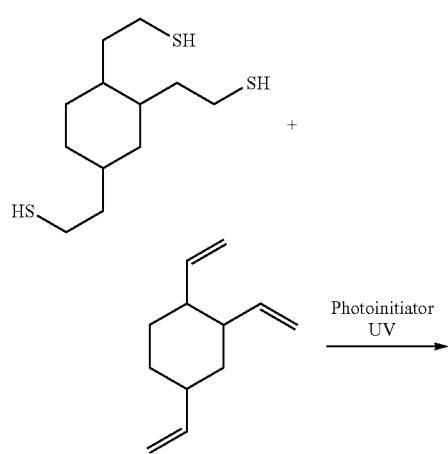

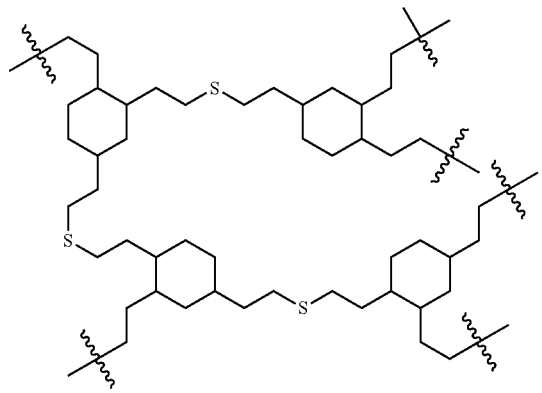

Example 8—Synthesis of Thiolene Film Composed of 2-[2,4-bis(2-mercaptoethyl)cyclohexyl]ethanthiol and 1,6-heptadiyne 2-[2,4-bis(2-mercaptoethyl)cyclohexyl]ethanethiol (1.15 g, 4.34 mmol) was combined with 1,6-heptadiyne (0.300 g, 3.26 mmol) and vortexed well. DMPA (0.36 mg) was added and the mixture vortexed again. The mixture was placed between two glass slides (75 mm×50 mm) with a teflon spacer (0.13 mm thick) and fastened by clips. The film was exposed to UV (H2 bulb (5×60 sec)) on three occasions. The film was carefully removed from the glass slides to give a clear film.

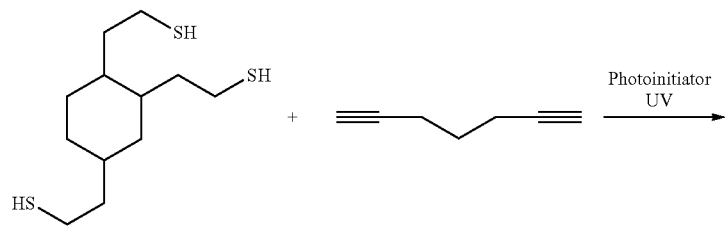

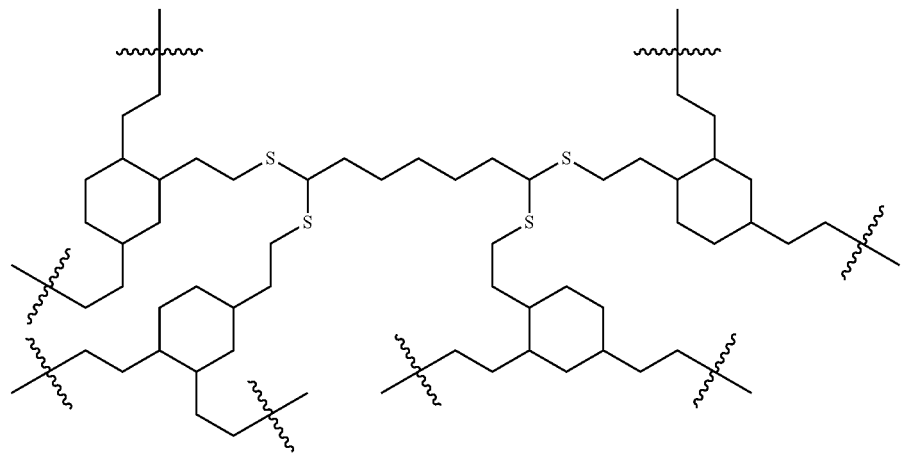

Example 9—Synthesis of Thiolene Film Composed of Polybutadiene and 1,6-hexanedithiol Polybutadiene (0.49 g; Mn=2900, 80% Vinyl) was combined with 1,6-hexanedithiol (0.54 g, 3.62 mmol) and vortexed well. A photoinitiator such as 2,2-Dimethoxy-2-phenylacetophenone (DMPA) can be added in a small amount (0.025 wt %) for faster curing of the film. The mixture was placed between two glass slides (75 mm×50 mm) and a Teflon spacer (0.13 mm thick) and fastened by clips. The film was exposed to UV (H bulb (5×60 sec)) on three occasions. The film was carefully removed from the glass slides to give a clear film.

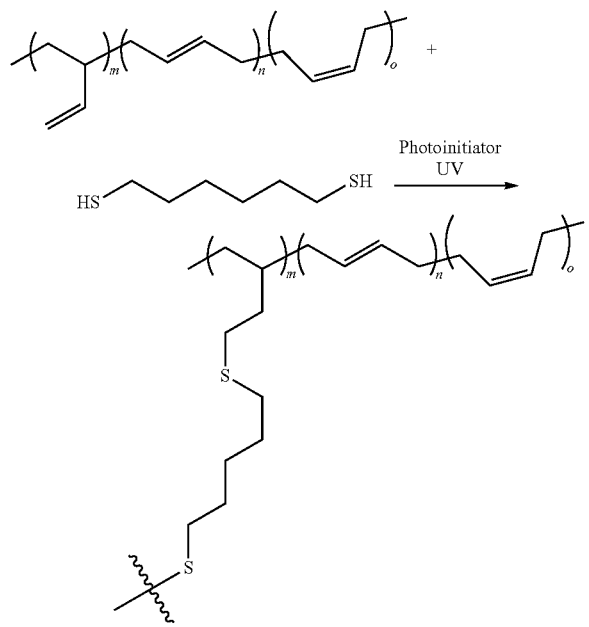

The copolymer material of Examples 1-9 above all gave excellent visual transmission at 5 mils thickness, and can be considered transparent in the visual spectrum. While visual transmission was not measured directly it would be estimate at >90%. The IR average absorption coefficient (alpha) of each example copolymer was:

Example 1—$\alpha$=33.3 cm$^{-1}$
Example 2—$\alpha$=125.6 cm$^{-1}$
Example 3—$\alpha$=213.9 cm$^{-1}$
Example 4—$\alpha$=182.2 cm$^{-1}$
Example 5—$\alpha$=100.6 cm$^{-1}$
Example 6—$\alpha$=83.2 cm$^{-1}$
Example 7—$\alpha$=127.7 cm$^{-1}$
Example 8—$\alpha$=131.6 cm$^{-1}$
Example 9—$\alpha$=59.1 cm$^{-1}$.

The average absorption coefficient values reported for the materials of examples 1 to 9 were determined for wavelengths of 8000 nm to 12000 nm using the procedure as explained below. The materials with lower absorption coefficients have better transmission at the tested wavelengths. As an example, the average absorption coefficient (alpha) for the copolymer materials alone can range from 225 or less, such as about 200 to 0, about 150 to 0, about 100 to 0 or about 75 to 0. The absorption coefficient can be determined using the following relationship:

$$\alpha = \frac{4\pi k}{\lambda}$$

Complex index of refraction = $n + ik$ where $\alpha$ is the absorption coefficient, $\lambda$ is the wavelength, and k is the imaginary portion of the complex index of refraction (n+ik). Both reflectance and transmission values for determining absorption coefficient at infrared wavelengths of 2.5 microns to 25 microns were collected using an SOC-100 Hemispherical Directional Reflectometer. The reflection and transmission values were used to determine the complex refractive index of the material using the Kramers-Kronig relationship. From the k value of the complex refractive index, the absorption coefficient (intrinsic attenuation within the material measured in per cm) was calculated. For each wavelength measured within the SOC-100, an alpha value was determined. From these values an average alpha value was calculated for the infrared waveband of 8000 nm to 12000 nm. For example, alpha values can be determined at 1000 nm increments from 8000 nm to 12000 nm and the values averaged to arrive at an average absorption coefficient.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A copolymer made from a thiol terminated hydrocarbon monomer and a terminally unsaturated hydrocarbon monomer, the terminally unsaturated hydrocarbon monomer being a polymer having 12 carbon atoms or more and comprising a plurality of unsaturated groups and the thiol terminated hydrocarbon monomer being a substituted or unsubstituted, linear, branched or cyclic $C_3$ to $C_{36}$ saturated hydrocarbon having two or more terminal thiol groups, wherein the copolymer is a linear polymer, branched polymer or crosslinked polymer network and is transparent to radiation in the visual spectrum and the infrared ("IR") wavelength range of about 4 microns to about 12 microns, wherein the thiol terminated hydrocarbon monomer and the terminally unsaturated hydrocarbon monomer react to form $A'_x B'_y$, where A' is the polymer units formed from the thiol terminated hydrocarbon monomer, B' is the polymer units formed from the terminally unsaturated hydrocarbon monomer and x and y each range from 0.3 to 0.7, where x+y=1; and with the proviso that if the terminally unsaturated hydrocarbon monomer is polybutadiene, the polybutadiene is a compound of formula 6:

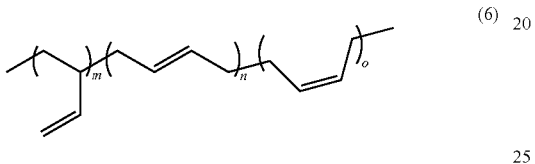

(6)

where:
m ranges from about 70 mol % to about 90 mol %; and
n and o each range from 0 mol % to about 30 mol %, where n+o ranges from about 10 mol % to about 30 mol %.

2. The copolymer of claim 1, wherein the thiol terminated hydrocarbon monomer is chosen from compounds of formulas 1 and 2:

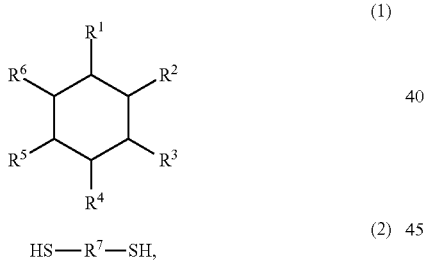

(1)

HS—R⁷—SH, (2)

where:
$R^1$, $R^2$, $R^3$, $R^4$, $R^5$, and $R^6$ are independently chosen from hydrogen, —SH and —R'SH, where R' is a $C^1$ to $C^{10}$ hydrocarbon bridge and at least two of $R^1$, $R^2$, $R^3$, $R^4$, $R^5$, and $R^6$ are not hydrogen; and
$R^7$ is a $C_2$ to $C_{10}$ hydrocarbon bridge.

3. The copolymer of claim 1, wherein the terminally unsaturated hydrocarbon monomer is the compound of formula 6.

4. The copolymer of claim 3, wherein the thiol terminated hydrocarbon monomer is a compound of formula 2:

HS—R⁷—SH 2, where $R^7$ is a $C_2$ to $C_{10}$ hydrocarbon bridge.

5. A method of forming a copolymer, the method comprising:
combining a thiol terminated hydrocarbon monomer and at least one additional monomer to form a mixture, the at least one additional monomer being chosen from compounds of (i) a terminally unsaturated hydrocarbon monomer and (ii) an isocyanate functionalized hydrocarbon monomer; and reacting the thiol terminated hydrocarbon monomer and the at least one additional monomer to form the copolymer, the copolymer being transparent to radiation in at least one of the visual spectrum or the infrared ("IR") wavelength range of about 4 microns to about 12 microns, with the following provisos:
if the at least one additional monomer is a terminally unsaturated hydrocarbon monomer, then the thiol terminated hydrocarbon monomer is a compound of formula 1:

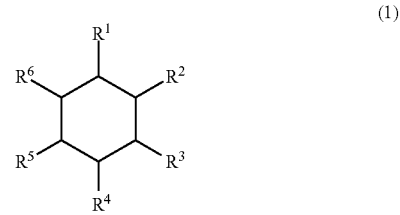

(1)

where $R^1$, $R^2$, $R^3$, $R^4$, $R^5$, and $R^6$ are independently chosen from hydrogen and R'SH, where R' is a $C_2$ to $C_{10}$ hydrocarbon bridge and at least two of $R^1$, $R^2$, $R^3$, $R^4$, $R^5$, and $R^6$ are not hydrogen;

if the terminally unsaturated hydrocarbon monomer is polybutadiene, the polybutadiene contains from about 10 mol % to about 30 mol % of polymer units in a cis-1,4-butadiene form; and if the at least one additional monomer is an isocyanate functionalized hydrocarbon monomer, then a ratio of the molecular mass of the thiol terminated hydrocarbon monomer to the number of sulfur atoms in the thiol terminated hydrocarbon monomer ranges from 65 to 500, if the at least one additional monomer is a terminally unsaturated hydrocarbon monomer then the thiol terminated hydrocarbon monomer and the terminally unsaturated hydrocarbon monomer react to form $A'_x B'_y$, where A' is the polymer units formed from the thiol terminated hydrocarbon monomer, B' is the polymer units formed from the terminally unsaturated hydrocarbon monomer and x and y each range from 0.3 to 0.7, where x+y=1; and if the at least one additional monomer is an isocyanate functionalized hydrocarbon monomer, then the thiol terminated hydrocarbon monomer is the compound of formula 1 above, where $R^1$, $R^2$, $R^3$, $R^4$, $R^5$, and $R^6$ are independently chosen from H, —SH and —R'SH, where R' is a $C_1$ to $C_{10}$ hydrocarbon bridge and at least two of $R^1$, $R^2$, $R^3$, $R^4$, $R^5$, and $R^6$ are not hydrogen.

6. The method of claim 5, wherein the at least one additional monomer is the terminally unsaturated hydrocarbon monomer, and further wherein the reacting comprises exposing the mixture to ultraviolet light.

7. The method of claim 6, wherein the terminally unsaturated hydrocarbon monomer is a compound of formulas of 3, 4, 5, or 6:

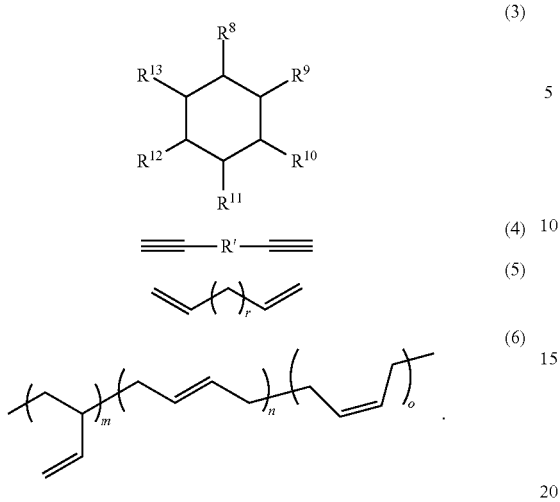

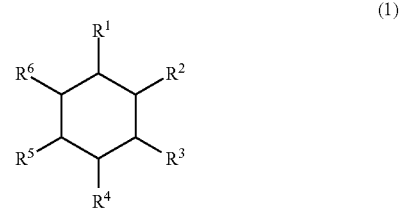

where:
R$^8$, R$^9$, R$^{10}$, R$^{11}$, R$^{12}$, and R$^{13}$ are independently chosen from H and alkenyl substituents having a terminal vinyl group, where at least two of R$^8$, R$^9$, R$^{10}$, R$^{11}$, R$^{12}$, and R$^{13}$ are not hydrogen;
R' is a $C_2$ to $C_{10}$ hydrocarbon bridge;
r is an integer ranging from 1 to 10;
m ranges from about 70 mol % to about 90 mol %, and n and o each range from 0 mol % to about 30 mol %, where n+o ranges from about 10 mol % to about 30 mol %.

8. The method of claim 5, wherein the at least one additional monomer is the isocyanate functionalized hydrocarbon monomer, and further wherein the reacting comprises adding a catalyst to the mixture.

9. The method of claim 8, wherein the catalyst is an amine.

10. The method of claim 8, wherein the isocyanate functionalized hydrocarbon monomer is a compound of formula 7 or 8:

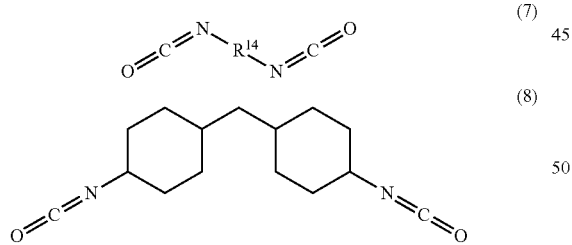

where R$^{14}$ is a $C_3$ to $C_{12}$ n-alkyl bridge.

11. The method of claim 5, wherein if the at least one additional monomer is an isocyanate functionalized hydrocarbon monomer, then the thiol terminated hydrocarbon monomer is the compound of formula 1 above, R$^1$, R$^2$, R$^3$, R$^4$, R$^5$, and R$^6$ are independently chosen from H and —R'SH, where R' is a $C_1$ to $C_{10}$ hydrocarbon bridge and at least two of R$^1$, R$^2$, R$^3$, R$^4$, R$^5$, and R$^6$ are not hydrogen.

12. A copolymer made from a thiol terminated hydrocarbon monomer and at least one additional monomer chosen from compounds of i) a terminally unsaturated hydrocarbon monomer and ii) an isocyanate functionalized hydrocarbon monomer, wherein the copolymer is a crosslinked polymer network and is transparent to radiation in at least one of the visual spectrum or the infrared ("IR") wavelength range of about 4 microns to about 12 microns, with the following provisos:
if the at least one additional monomer is a terminally unsaturated hydrocarbon monomer, then the thiol terminated hydrocarbon monomer is a compound of formula 1:

where R$^1$, R$^2$, R$^3$, R$^4$, R$^5$, and R$^6$ are independently chosen from hydrogen and —R'SH, where R' is a $C_2$ to $C_{10}$ hydrocarbon bridge and at least two of R$^1$, R$^2$, R$^3$, R$^4$, R$^5$, and R$^6$ are not hydrogen;

if the terminally unsaturated hydrocarbon monomer is polybutadiene, the polybutadiene contains from about 0 mol % to about 30 mol % of polymer units in a cis-1,4-butadiene form;

if the at least one additional monomer is an isocyanate functionalized hydrocarbon monomer, then a ratio of the molecular mass of the thiol terminated hydrocarbon monomer to the number of sulfur atoms in the thiol terminated hydrocarbon monomer ranges from 65 to about 500; and if the at least one additional monomer is a terminally unsaturated hydrocarbon monomer then the thiol terminated hydrocarbon monomer and the terminally unsaturated hydrocarbon monomer react to form A'$_x$B'$_y$, where A' is the polymer units formed from the thiol terminated hydrocarbon monomer, B' is the polymer units formed from the terminally unsaturated hydrocarbon monomer and x and y each range from 0.3 to 0.7, where x+y=1; and if the at least one additional monomer is an isocyanate functionalized hydrocarbon monomer, then the thiol terminated hydrocarbon monomer is a compound of formula 1 above, where R$^1$, R$^2$, R$^3$, R$^4$, R$^5$, and R$^6$ are independently chosen from H, —SH and —R'SH, where R' is a $C_1$ to $C_{10}$ hydrocarbon bridge and at least two of R$^1$, R$^2$, R$^3$, R$^4$, R$^5$, and R$^6$ are not hydrogen.

13. The copolymer of claim 12, wherein the at least one additional monomer is the terminally unsaturated hydrocarbon monomer.

14. The copolymer of claim 12, wherein the terminally unsaturated hydrocarbon monomer is a substituted or unsubstituted, linear, branched or cyclic $C_3$ to $C_{36}$ hydrocarbon that is internally saturated and has two or more terminal vinyl or alkynyl groups.

15. The copolymer of claim 12, wherein the terminally unsaturated hydrocarbon monomer is a compound of formulas of 3, 4, or 5:

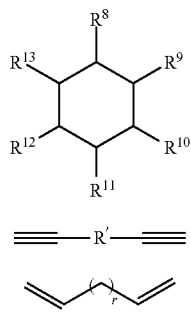 (3)

$$\equiv\!\!-\!\!R'\!\!-\!\!\equiv \quad (4)$$

$$\overset{(\ )_r}{\diagdown\!\!\diagup\!\!\diagdown\!\!\diagup} \quad (5)$$

where:

$R^8, R^9, R^{10}, R^{11}, R^{12}$, and $R^{13}$ are independently chosen from hydrogen and alkenyl substituents having a terminal vinyl group, where at least two of $R^8$, $R^9$, $R^{10}$, $R^{11}$, $R^{12}$, and $R^{13}$ are not hydrogen;

R' is a $C_2$ to $C_{10}$ hydrocarbon bridge; and r is an integer ranging from 1 to 10.

16. The copolymer of claim 12, wherein the at least one additional monomer is the isocyanate functionalized hydrocarbon monomer.

17. The copolymer of claim 16, wherein the isocyanate functionalized hydrocarbon monomer is a substituted or unsubstituted, linear, branched or cyclic $C_3$ to $C_{36}$ saturated hydrocarbon monomer having two or more terminal isocyanate groups.

18. The copolymer of claim 16, wherein the isocyanate functionalized hydrocarbon monomer is a compound of formula 7 or 8:

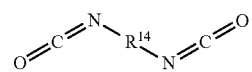 (7)

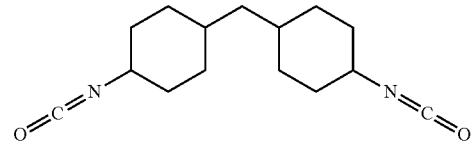 (8)

where $R^{14}$ is a $C_3$ to $C_{12}$ n-alkyl bridge.

19. The copolymer of claim 12, wherein if the at least one additional monomer is an isocyanate functionalized hydrocarbon monomer, then the thiol terminated hydrocarbon monomer is the compound of formula 1 above, $R^1$, $R^2$, $R^3$, $R^4$, $R^5$, and $R^6$ are independently chosen from H and —R'SH, where R' is a $C_1$ to $C_{10}$ hydrocarbon bridge and at least two of $R^1$, $R^2$, $R^3$, $R^4$, $R^5$, and $R^6$ are not hydrogen.

* * * * *